(12) United States Patent
Duggal et al.

(10) Patent No.: US 11,113,716 B2
(45) Date of Patent: Sep. 7, 2021

(54) ATTRIBUTION THAT ACCOUNTS FOR EXTERNAL VIEWING CONDITIONS

(71) Applicant: ADOBE INC., San Jose, CA (US)

(72) Inventors: Ashish Duggal, Delhi (IN); Anmol Dhawan, Uttar Pradesh (IN); Sachin Soni, New Delhi (IN); Russell Stringham, Orem, UT (US)

(73) Assignee: ADOBE INC., San Jose, CA (US)

( * ) Notice: Subject to any disclaimer, the term of this patent is extended or adjusted under 35 U.S.C. 154(b) by 351 days.

(21) Appl. No.: 15/193,576

(22) Filed: Jun. 27, 2016

(65) Prior Publication Data

US 2017/0372350 A1     Dec. 28, 2017

(51) Int. Cl.
G06Q 30/00     (2012.01)
G06Q 30/02     (2012.01)

(52) U.S. Cl.
CPC .............................. *G06Q 30/0244* (2013.01)

(58) Field of Classification Search
None
See application file for complete search history.

(56) References Cited

U.S. PATENT DOCUMENTS

| | | | | |
|---|---|---|---|---|
| 2010/0120465 A1* | 5/2010 | Chung | ............... | G06Q 30/0242 455/550.1 |
| 2010/0265311 A1* | 10/2010 | Carpenter, Jr. | .... | G06Q 30/0268 348/14.08 |
| 2013/0006706 A1* | 1/2013 | Harvey | ............. | G06Q 10/0639 705/7.29 |
| 2015/0127590 A1* | 5/2015 | Gay | ......................... | G06N 5/02 706/12 |
| 2015/0161654 A1* | 6/2015 | Little | .................. | G06Q 30/0242 705/14.42 |
| 2015/0302450 A1* | 10/2015 | Katz | .................... | G06Q 20/322 705/14.25 |
| 2016/0063427 A1* | 3/2016 | Xu | .................... | G06Q 10/06398 705/7.42 |
| 2017/0169470 A1* | 6/2017 | Deluca | .................... | H04L 67/12 |
| 2017/0228776 A1* | 8/2017 | Walden | .............. | G06Q 30/0273 |
| 2017/0323343 A1* | 11/2017 | Dey | .................... | G06Q 30/0267 |
| 2017/0337578 A1* | 11/2017 | Chittilappilly | ...... | G06Q 30/0246 |
| 2017/0347232 A1* | 11/2017 | Varshavsky | ........... | H04W 4/027 |
| 2018/0005261 A9* | 1/2018 | Chittilappilly | ...... | G06Q 30/0241 |
| 2018/0225645 A1* | 8/2018 | Thrope | .................. | G01C 21/00 |
| 2020/0177944 A1* | 6/2020 | Wasserman | ........ | H04N 21/4586 |

* cited by examiner

*Primary Examiner* — Alvin L Brown
(74) *Attorney, Agent, or Firm* — F. Chau & Associates, LLC

(57) ABSTRACT

Systems and methods are disclosed herein for attributing credit to online consumer touchpoints for a consumer performing an action. The systems and methods involve determining whether a consumer is in a particular environment for an online consumer touchpoint by detecting an external viewing condition for the consumer for the online consumer touchpoint. The systems and methods determine that the consumer performed an action, such as a conversion, following the online consumer touchpoint and additional online consumer touchpoints. An effectiveness of the online consumer touchpoint in the particular environment is determined and used to attribute relative credit to the online consumer touchpoint and the additional online consumer touchpoints for the consumer performing the action.

20 Claims, 6 Drawing Sheets

ATTRIBUTION THAT ACCOUNTS FOR EXTERNAL VIEWING CONDITIONS

TECHNICAL FIELD

This disclosure relates generally to computer-implemented methods and systems and more particularly relates to improving the efficiency and effectiveness of computing systems used to monitor online consumer touchpoints and/or create, manage, and/or distribute online ads.

BACKGROUND

Consumers execute content viewing applications, web browsers, search engines, social media applications, and other television and computer tools to interact with electronic content through electronic networks, i.e., online. Online ads are also provided to these consumers. In one example, a consumer is presented with a promotion for a retail item when the consumer interacts with a particular webpage or initiates a search engine search using a particular keyword. Digital analysts and marketers use sophisticated software and systems to understand which online marketing efforts (e-mail, keyword search ads, display ads, social media ads, text ads, image ads, video ads, etc.) are most likely to be successful. In this context, they repeatedly face the challenge of accurately measuring the impact of their marketing investments across paid, earned and owned channels and ad formats.

Attribution is the process of measuring and assigning credit to online consumer touchpoints that influence a consumer along the consumer's path to conversion. The goal of attribution is to help the marketer understand which consumer interactions are most likely to contribute to consumers taking a desired action so that the marketer can spend more money for online ads related to those consumer interactions and less money in the areas that are less successful. In a sense, attribution provides a relative cost/benefit analysis of various consumer interactions so that the marketer can allocate a given budget to spend more on particular ad locations, websites, etc., to improve expected return on investment. Existing attribution techniques do not adequately account for the various circumstances, such as the external viewing conditions, in which consumers experience online ads and other online consumer touchpoints. This results in attributions and/or online ad placements that are not sufficiently targeted or effective.

SUMMARY

Systems and methods are disclosed herein for attributing credit to online consumer touchpoints for a consumer performing an action. The systems and methods involve determining whether a consumer is in a particular environment for an online consumer touchpoint by detecting an external viewing condition for the consumer for the online consumer touchpoint. The systems and methods determine that, following the online consumer touchpoint and additional online consumer touchpoints, the consumer performed an action, such as a conversion. An effectiveness of the online consumer touchpoint in the particular environment is determined and used to attribute relative credit to the online consumer touchpoint and the additional online consumer touchpoints for the consumer performing the action.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
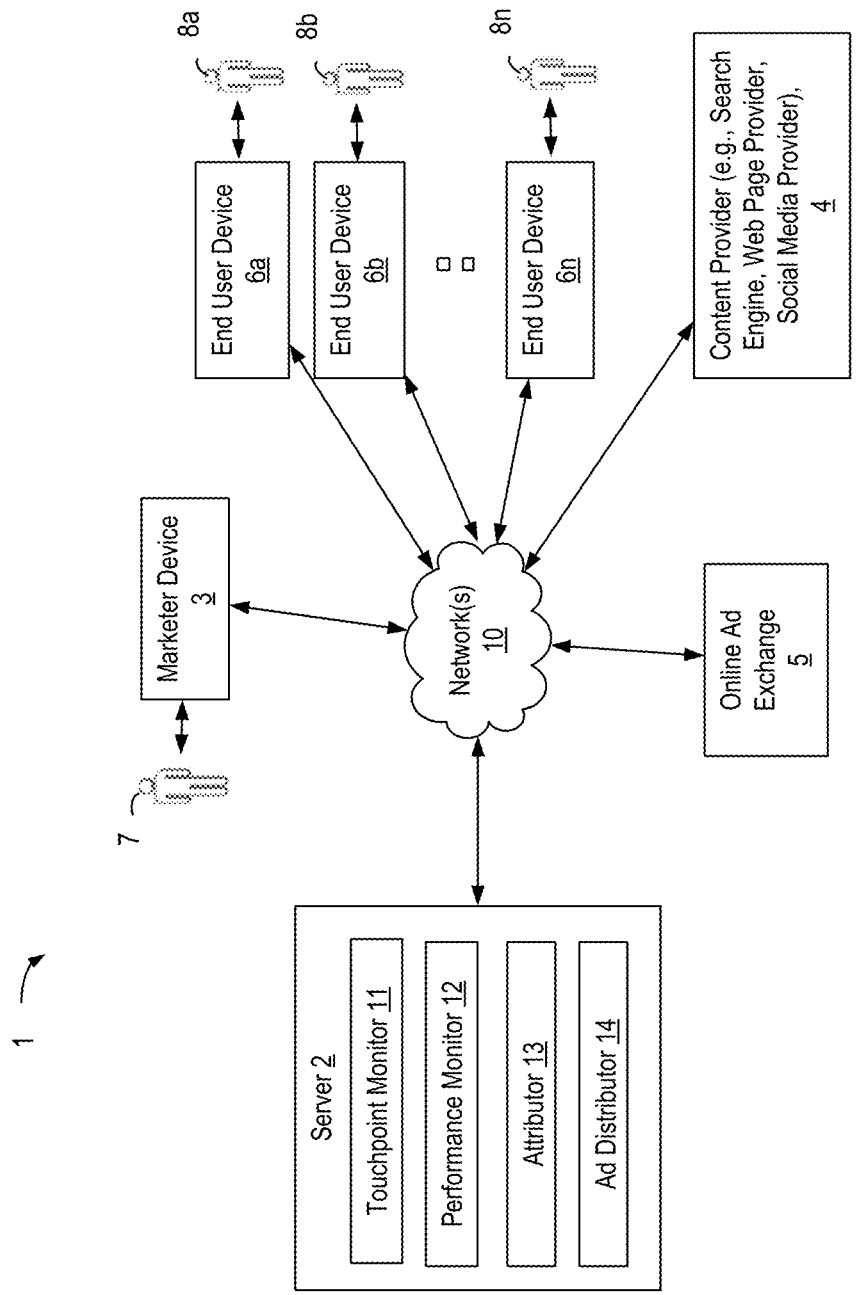
FIG. 1 illustrates an exemplary computer network environment 1 in which an exemplary system attributes credit to online consumer touchpoints for a consumer performing an action.

As described above, existing attribution techniques do not adequately account for and distinguish the external viewing conditions of online consumer touchpoints. Improved techniques for attribution are provided herein that account for and distinguish the external viewing conditions of online consumer touchpoints in attributing credit to online consumer touchpoints for desired activities such as consumer purchases and other conversions. One embodiment of the invention determines whether a consumer is in a particular environment while interacting with an online ad by tracking an external viewing condition for the consumer viewing the online ad. For example, the technique collects information about the ambient noise around consumer devices, user heartrate, device motion, device rotation, etc. to identify whether consumers are walking, running, on an elliptical machine, in a moving vehicle, talking with someone else, or otherwise in distracting environments while the consumers are interacting online.

The information about external viewing conditions is used to determine the effectiveness of particular online consumer touchpoints in particular external viewing conditions and ultimately used to create or adjust an attribution. In a specific example, the technique determines that banner ads lead to conversions in 5% the general instances, but in only 2% of the instances in which the consumer is walking. This effectiveness information is used to determine or adjust an attribution that is ultimately useful to improve the distribution of online ads, compensate touchpoint providers, and/or for other purposes. In one example, the technique attributes relative credit to online ads that a given consumer interacted with prior to converting, e.g., purchasing a product or service advertised by online ads. For example, if an analytics process determines that there were four touch points (T1, T2, T3 and T4) involving four respective online consumer touchpoints with the corresponding attribution (25%, 35%, 30% and 10%) using an attribution algorithm, the technique recognizes that touch point 3 (a banner ad) was viewed while the consumer was walking and therefore, its actual attribution should be $30*(2/5)=12\%$ instead of 30%, based on an understanding that banner ads are only ⅔ as effective when a consumer is walking. The remaining 18% (i.e., 30%-12%) from its original attribution is attributed to T1, T2 and T3, for example, distributing the original attribution proportionally (i.e., giving a new attribution 31.4%, 44%, 12%, 12.6%). The adjusted attribution more accurately credits the online consumer touchpoints because it takes into account whether the consumer is in a particular consuming environment, e.g., in a distracting environment, while one or more of the online consumer touchpoints occurred.

As used herein, the phrase "consumer" refers to any person who uses or who may someday use an electronic device such as a computer, tablet, or cell phone to execute a web browser, use a search engine, use a social media application, or otherwise use the electronic device to access electronic content via an electronic network such as the Internet. Accordingly, the phrase "consumer" includes any person that data is collected about via electronic devices, in-store interactions, and any other electronic and real world sources. Consumers are often targeted by marketing campaigns by marketers wishing the consumers to take a desired action such as purchasing a product or service or otherwise taking an action that results in a conversion.

As used herein, the phrase "online consumer touchpoint" refers to a consumer receiving, viewing, accessing, selecting, or otherwise using electronic content that is received through electronic networks such as the Internet. Some, but not necessarily all, consumers access and interact with online ads received through electronic networks such as the Internet. Marketers send some consumers online ads to advertise products and services using electronic networks such as the Internet.

As used herein, the phrase "external viewing condition" refers to an attribute or state of the surroundings of the device being used by the consumer while viewing electronic content online or to an attribute or state of the consumer. Generally, the external viewing conditions are around or about a consumer and are indicative of whether something in the consumer's environment and/or something that the user is doing could distract the consumer or otherwise change the effectiveness of the consumer's online interaction. External viewing conditions include, but are not limited to, measures of conditions in the area around a device being used by a consumer including the conditions of the sound, temperature, light, elevation, weather, crowdedness, and other measurable conditions of the area. For example, an attribute (e.g., volume, amount, type, etc.) of the noise around the device that the consumer is using is an external viewing condition that is potentially indicative of a distracting environment. As another example, an attribute of the light (e.g., brightness, consistency, indoor versus outdoor) around the device that the consumer is using is an external viewing condition indicative of the environment in which the consumer is interacting while online. The movement of the device, which is potentially indicative of whether the consumer is walking, running, still, or in a moving vehicle, is another example of an external viewing condition. Another example, is the consumer's heartrate. Another example is the movement or rotation of the device, for example, where a flat device may indicate that the consumer is potentially distracted in conversation or a device with regular movements may indicate that the consumer is walking, climbing stairs, etc. Attributes of the consumer are also external viewing conditions including, but not limited to, the consumer's heartrate, internal body temperature, skin temperature, blood oxygen level, blood pressure, eye gaze, eye opened versus closed, grip pressure, posture, perspiration, and other conditions of the consumer.

As used herein, the phrase "environment" refers to a state of the consumer surroundings and/or of the consumer while the consumer experiences an online consumer touchpoint. The environment is indicated by one or more external viewing conditions. For example, a distracting environment is indicated by a level of ambient noise above a certain level and/or based on movement of the consumer's device indicating that the consumer is running. As another example, a distracting environment is indicated by the consumer's device moving in a pattern indicative of an in-person conversation occurring and/or by the consumer's device receiving a telephone call that is answered during an online consumer touchpoint.

As used herein, the phrases "attributing credit" or "attribution" refer to any process of assigning credit to online consumer touchpoints that influence a consumer along the consumer's path to conversion or other desired action. The goal of attribution is to help the marketer understand which consumer interactions are most likely to contribute to consumers taking a desired action so that the marketer can spend more money for online ads related to those consumer interactions and less money in the areas that are less successful. In one embodiment, the marketer specifies that credit will be attributed based on the type of online consumer touchpoints, e.g., receiving banner ad, e-mail distribution list signup, etc. In another embodiment, the marketer specifies that credit will be attributed more granularly, e.g., to particular online ad content. In general, the allocation provides a relative cost/benefit analysis of various consumer interactions that a marketer can use to better allocate a given budget to spend more on particular ad locations, websites, etc., to improve expected return on investment.

As used herein, the phrase "effectiveness" refers to measures (quantitatively or otherwise) of the likelihood that participation by a consumer in a particular online consumer touchpoint will result in a conversion or other desired action by the consumer. Effectiveness is determined generally and for particular environments in one embodiment of the invention. In one example, an effectiveness of banner ads for a marketing campaign is a number, e.g., 0.05, that represents that banner ads in the campaign lead to conversions in 5% the general instances. Similarly, the effectiveness of banner ads is the number 0.02 that represents that banner ads in the campaign lead to conversions in only 2% of the instances in which the consumer is walking.

As used herein, the phrase "online ad" refers to an advertisement, post, or other electronic content of any media type that promotes an idea, product, or service and that is provided electronically in or with a web page, social media, keyword search result, e-mail, or other electronic communication sent, accessed by, or made available to one or more consumers through a computer network such as the Internet. Examples of online ads include, but are not limited to, images, text, graphics, sound, and/or video incorporated into a web page, mobile app, email, search engine result, television content, or social media content on a social media app or web page that advertise or otherwise promote or sell something, usually a business's product or service.

As used herein, the phrase "electronic content" refers to any content in an electronic communication such as a web page or e-mail accessed by, or made available to, one or more consumers through a computer network such as the Internet. Examples of electronic content include, but are not limited to, images, text, graphics, sound, and/or video incorporated into a web page, search engine result, or social media content on a social media app or web page.

As used herein, the phrase "social media" refers to computer-mediated features that use the Internet or other electronic communications to allow people and/or companies to create, share, and exchange information, interests, and electronic content in virtual communities and social networks. Users of social media often, but not always, have profiles and/or accounts associated with friends or followers that receive or are notified of electronic content that is created, shared, or exchanged by the person(s) or company(ies) associated with the profile or account. In many, but not necessarily all, social media platforms, one or more of the participants are able to respond to, repost, or otherwise follow up on a topic of another user's creation, sharing, or exchange of electronic content. Accordingly, social media platforms often, but not necessarily always, provide highly interactive platforms through which people and companies discuss topics and disseminate information about one or more topics. Some social media operate using dialogic transmission in which there are many sources of electronic content received by many others.

As used herein, the phrases "campaign" and "marketing campaign" refer to a marketing effort comprising one or more online ads and other online consumer touchpoints with a marketing objective such as increasing brand awareness for a particular brand or selling a particular product. A campaign is often associated with a "budget" that is to be spent over the duration of the campaign. A "budget" can be broken down into smaller increments, e.g., a daily budget, weekly budget, monthly budget, etc., for a given campaign. A "portfolio" includes one or more "campaigns."

FIG. 1 illustrates an exemplary computer network environment 1 in which an exemplary system attributes credit to online consumer touchpoints for a consumer performing an action. The exemplary computer network environment 1 includes a server 2, a marketer device 3, an exemplary content provider 4, an online ad exchange 5, and consumer devices 6a-n. Consumer devices 6a-n are used by consumers 8a-n to access electronic content via network 10 from content providers such as content provider 4. A marketer 7 implements a marketing campaign to distribute online ads along with the content that is obtained by the consumers 8a-n and viewed (or experienced) on consumer devices 6a-n. For example, marketer 7 uses marketer device 2 to specify parameters of a marketing campaign that is ultimately used to determine how a marketing campaign budget will be used to pay for placement of the online ads with the electronic content obtained by the consumers 8a-n.

Server 2 includes a touchpoint monitor 11, a performance monitor 12, an attributor 13, and an ad distributor 14. In other embodiments, these and/or additional features are separately provided using multiple servers at a single or multiple geographic or network locations.

The touchpoint monitor 11 receives information about occurrences of online consumer touchpoints in which consumers receive, view, access, select, or otherwise use electronic content. Touchpoint information is received directly from consumer devices 6a-n and/or from a separate analytics system (not shown) that tracks information sent to consumer devices 6a-n and use of consumer devices 6a-n.

The touchpoint monitor 11 tracks external viewing conditions of touchpoints. For example, end point devices 6a-n include one or more sensors that monitor or identify the state of the surrounding at consumer devices 6a-n or the consumers using the consumer devices 6a-n and that information, when it is available, is received by the touchpoint monitor 11 as information about the touchpoints.

In one embodiment, the touchpoint monitor 11 specifies external viewing condition thresholds such as thresholds defining a distracting environment. As a specific example, the touchpoint monitor 11 defines when the ambient noise around a consumer device 6a-n is above a threshold level, the environment will be considered a distracting environment. Based on this threshold, the touchpoint monitor receives information about the ambient noise around end point devices 6a-n that allows the touchpoint monitor 11 to determine whether a touchpoint occurred while the consumer was in a distracting environment or not.

Various attributes of the noise, light, and movement of the consumer devices 6a-n and/or attributes of the physical condition or state of the consumers 8a-n are monitored or identified. Monitoring or identifying these attributes allows the touchpoint monitor 11 to estimate the type of environments in which touchpoints occur and/or how distracted the consumers 8a-n are during the touchpoints.

The performance monitor 12 receives information about conversions and other desired consumer actions. This performance information is received directly from consumer devices 6a-n and/or from a separate analytics system (not shown) that tracks information use of consumer devices 6a-n and/or other consumer information of whether a consumer makes a purchase, a conversion occurs, or other desired action is taken by the consumers. For example, a consumer making an online purchase by completing an online shopping cart transaction, e.g., adding an item to the shopping cart, providing payment information, and selecting a "complete purchase" button on the shopping cart webpage user interface is tracked as a desired action. A marketer can specify what type or types of consumer actions are to be tracked as desired actions.

The attributor 13 identifies touchpoints with a consumer that should receive credit for the consumer taking a desired action. For example, after a consumer makes an online purchase (i.e., the desired action), the attributor 13 identifies the online consumer touchpoints that occurred with the consumer prior to the online purchase. The attributor 13 determines an attribution that attributes relative amounts of credit to those online consumer touchpoints that influenced the consumer along the consumer's path to making the online purchase or other desired action. In one embodiment, the marketer configures the attributor 13 so that credit will be attributed based on type of online consumer touchpoints, e.g., receiving banner ad, e-mail distribution list signup, etc. In another embodiment, the marketer configures the attributor 13 so that credit will be attributed more granularly, e.g., to particular online ad content, so that the consumer viewing banner ad 1 on the marketer's webpage might receive a different amount of credit than the consumer viewing banner ad 2 on the marketer's webpage. In general, the allocation provides a relative cost/benefit analysis of various consumer interactions that a marketer can use to better allocate a given budget to spend more on particular ad locations, websites, ad content, etc., to improve expected return on investment.

The ad distributor 14 distributes online ads to consumers. For example, a marketer 7 uses the ad distributor to deploy display ads on the marketer's company's own webpages and the webpages of other entities. In one example, the ad distributor 14 implements a marketing strategy that specifies how online ads will be distributed using a budget by interacting with online ad exchange 5 to place online ads with electronic content provided by content provider 4 to end users 8a-n using end user devices 6a-n.

Figure 2:
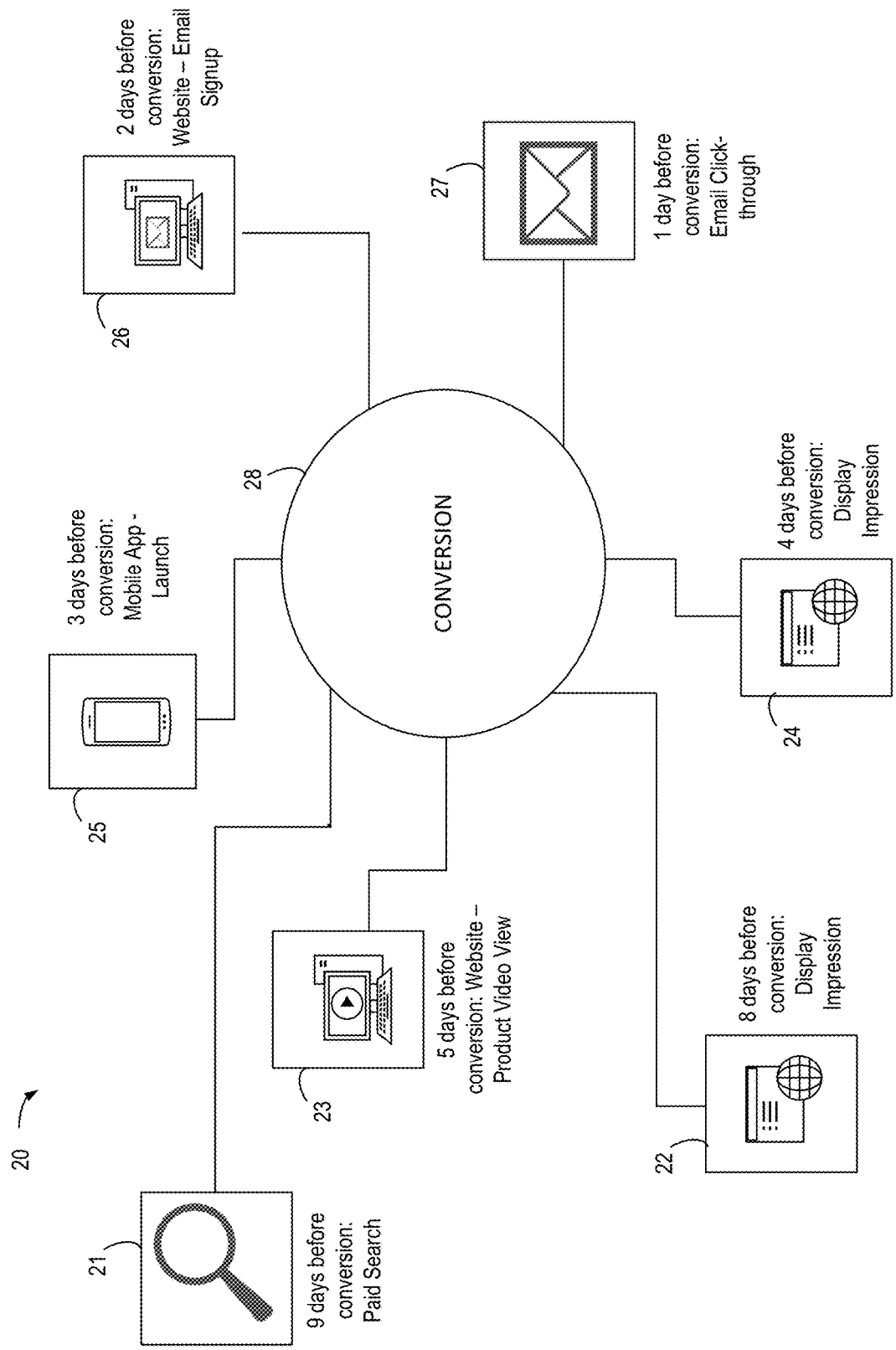
FIG. 2 illustrates a flow chart illustrating a sequence of tracked touchpoints resulting in a conversion.

FIG. 2 illustrates a flow chart illustrating a sequence 20 of tracked touchpoints resulting in a conversion. In this example, a first touchpoint 21 involves the consumer performing a paid search nine days before the conversion 28 and a second touchpoint 22 involves displaying an online ad to the consumer (a display impression) eight days before the conversion 28. A third touchpoint 23 involves the consumer viewing a product on the marketer's website five days before the conversion 28. A fourth touchpoint 24 involves displaying an online ad to the consumer (a display impression) four days before the conversion 28. A fifth touchpoint 25 involves the consumer launching the marketer's application three days before the conversion 28. A sixth touchpoint 26 involves the consumer signing up for e-mail information and offers for the marketer's products two days before the conversion 28. Finally, a seventh touchpoint 27 involves the consumer clicking on a link in an online ad provided via e-mail to the consumer one day prior to the conversion 28. These touchpoints are tracked by tracking the distribution of online ads and electronic content to the consumer and/or by tracking the consumer's actions (e.g., e-mail sign-up requests, clicks, etc.)

Figure 3:
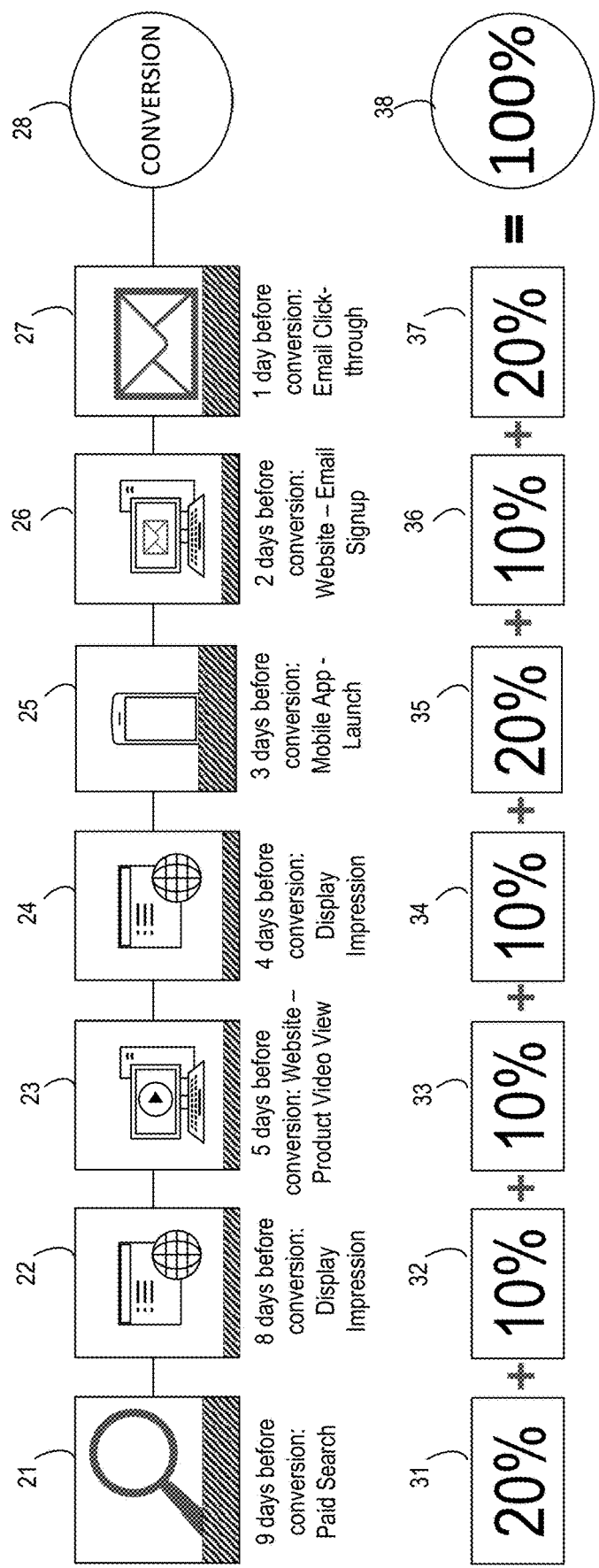
FIG. 3 illustrates an exemplary attribution of credit for a conversion to the touchpoints illustrated in FIG. 2.

FIG. 3 illustrates an exemplary attribution 30 of credit for a conversion to the touchpoints illustrated in FIG. 2. In this example, touchpoint 21 is attributed a first percentage 31, i.e., 20%, of the credit for the conversion 28, touchpoint 22 is attributed a second percentage 32, i.e., 10%, of the credit for the conversion 28, touchpoint 23 is attributed a third percentage 33, i.e., 10%, of the credit for the conversion 28, touchpoint 24 is attributed a fourth percentage 34, i.e., 10%, of the credit for the conversion 28, touchpoint 25 is attributed a firth percentage 35, i.e., 20%, of the credit for the conversion 28, touchpoint 26 is attributed a sixth percentage 36, i.e., 10%, of the credit for the conversion 28, and touchpoint 27 is attributed a seventh percentage 37, i.e., 20%, of the credit for the conversion 28. In this example, the percentages of credit for the conversion 31-37 add to 100%. Note that the attributed credit adds to less than 100% in other implementations. For example, the attribution method may assume that a certain number of sales would have happened anyway, even if there had been no advertising. In those implementations in which some base sales are expected to happen, the percentages of credit for the touchpoints can be considered the lift above the base number of sales. The exemplary attribution 30 in this example is determined using an algorithm that uses information about touchpoints and conversions for multiple consumers to statistically determine the effectiveness of different types of touchpoints (i.e., different online ad types, different interaction types, and/or different online ad content) and uses that information to attribute credit to touchpoints for individual conversions.

Figure 4:
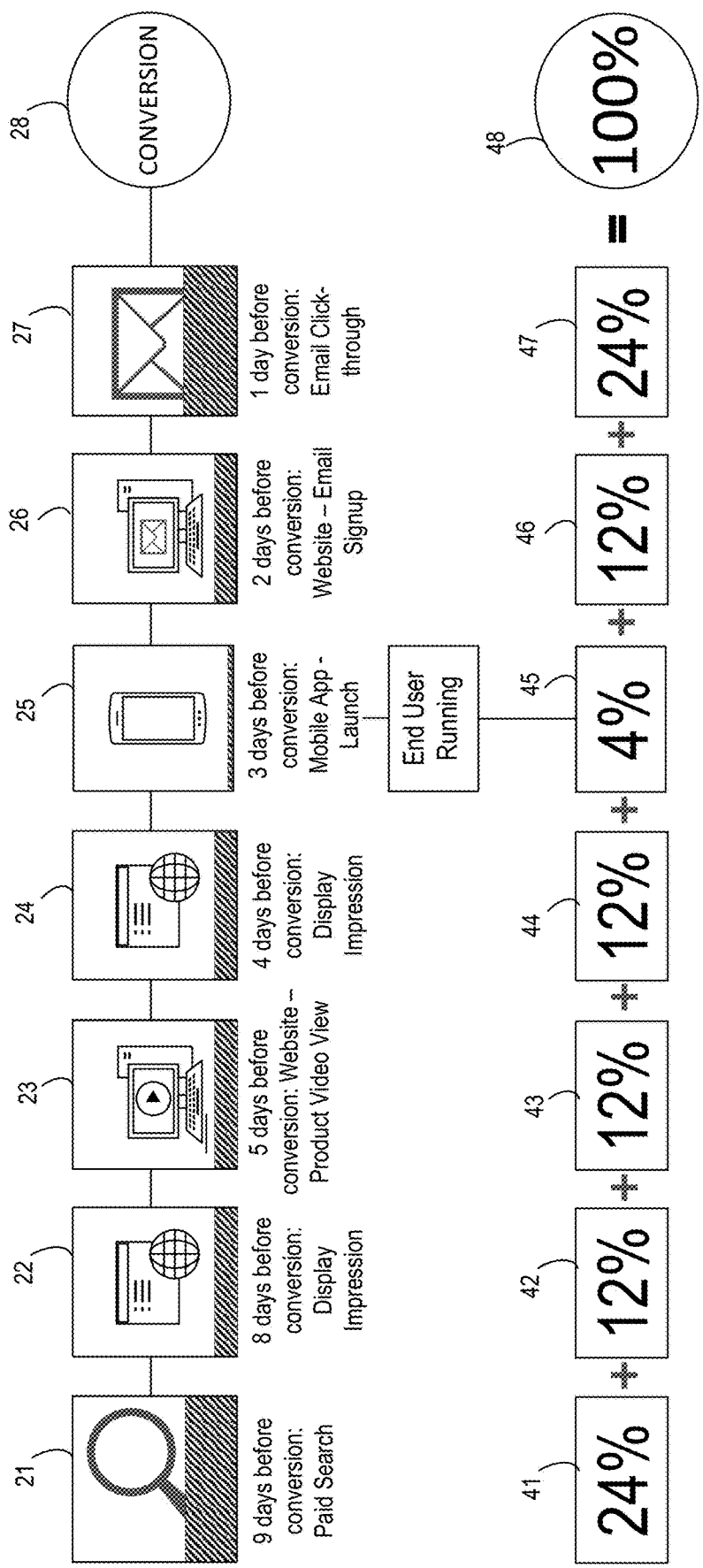
FIG. 4 illustrates an exemplary adjustment to the attribution illustrated in FIG. 3.

FIG. 4 illustrates an exemplary adjustment to the attribution of credit 40 for a conversion illustrated in FIG. 3. In this example, it is determined that mobile app launch touchpoints are less effective when the consumers are running (as opposed to generally). Thus for the external viewing conditions in which consumers are running an adjustment to the normal condition attribution for a mobile application launch is desirable. In this particular example, the system determines that the mobile app launch touchpoints are only 20% as effective when the consumers are running. Accordingly, the attribution of credit 45 for touchpoint 25 is reduced to one fifth of its normal condition value, i.e., reduced from 20% to 4%. The remaining attributions of credit 41, 42, 43, 44, 46, 47 are adjusted to account for the reduction in the attribution of credit 45 for touchpoint 25. In this example, touchpoint 21 is attributed a first percentage 41, i.e., 24%, of the credit for the conversion 28, touchpoint 22 is attributed a second percentage 42, i.e., 12%, of the credit for the conversion 28, touchpoint 23 is attributed a third percentage 43, i.e., 12%, of the credit for the conversion 28, touchpoint 24 is attributed a fourth percentage 44, i.e., 12%, of the credit for the conversion 28, touchpoint 25 is attributed a firth percentage 45, i.e., 4%, of the credit for the conversion 28, touchpoint 26 is attributed a sixth percentage 46, i.e., 12%, of the credit for the conversion 28, and touchpoint 27 is attributed a seventh percentage 47, i.e., 24%, of the credit for the conversion 28. In this way, the adjusted attribution 41 accounts for the external viewing condition of the consumer running while launching the mobile app. This example is provided to illustrate generally how such an adjustment can be implemented. More complex implementations can involve adjusting credit for multiple touchpoints based on multiple and differing external viewing conditions and use the same principles.

The adjustments to credit to touchpoints in an attribution can further account for uncertainty. For example, if the system determines that it is 50% likely that a particular external viewing condition is present during the touchpoint, the system determine an appropriate adjustment based on this uncertainty. As a specific example, if it is 50% likely that the user is running in the above example of FIG. 4, the credit attributed to touchpoint 25 may only be reduced to three fifths of its normal, i.e., reduced from 20% to 12%. In this example, the adjustment to the credit attributed is reduced proportionally based on the certainty that the external viewing condition was present.

Returning to FIG. 1, the monitoring of online consumer touchpoints and consumer performance of desired actions and the attributing of credit to those online consumer touchpoints allows server 2 to account for the entire consumer journey, including the consumer's interactions with paid and owned media. The online consumer touchpoints are tracked with respect to particular external viewing conditions to provide a more complete picture of the consumer's activities and a more accurate attribution. Assume that a consumer is consuming a campaign or a paid search result or marketing email or visiting a marketer's product website etc. via his mobile device or tablet, etc. The attribution of this online consumer touchpoint that contributed to conversion is tailored to also depend on "how well this user was able to consume the product information during the visit." As an example, the attribution depends on whether (1) the consumer was at a crowded/noisy location when he visited the product page in the marketer's app; (2) the consumer was walking, running (on a treadmill with phone placed on the corresponding socket) or travelling in a car while he saw/clicked on a paid search result for the marketer's product; or (3) the consumer moved or rotated his mobile phone as determined by the built-in accelerometer & gyroscope while consuming a display campaign as he was talking to his friend.

The condition in which consumers consume a marketing campaign are not homogenous and the attribution process takes this into account. The process learns over time how conditions around audiences e.g., noise, walking while consuming campaign, moving/rotating mobile, etc., affect further actions, such as conversions, by the consumers. For example, the system learns that a consumer consuming a campaign in noisy surroundings is 20% less likely to click/convert over than a person in a quite location. The process then uses this learning to attribute credit for each online consumer touchpoint by taking into account the condition around audiences while they consumed the campaign. In this way, the attribution is tailored based on online consumer touchpoints that account for noise, consumer movement, device movement, and other external viewing conditions that are determined to be meaningful in the attribution of credit to online consumer touchpoints for consumer actions.

When the touchpoint monitor 11 determines an online consumer touchpoint is influencing a consumer during his path to conversion, along with recording the corresponding online consumer touchpoint, the touchpoint monitor 11 also stores information about the corresponding external viewing conditions/environment in which the touchpoint occurred. The touchpoint monitor 11 can store information about a variety of external viewing conditions and overtime determine which of the external viewing conditions are influential and how such conditions are influential. For example, the touchpoint monitor 11 can collect noise information and the noise information can be analyzed to determine attributes of the consumer's surrounding including, but not limited to, overall noise volume, whether overall noise volume exceeds a particular threshold value, noise volume for particular sound frequency ranges, the number of voices, the pitch or other characteristics of voices (possibly indicative of children and babies, etc.), whether there is music, whether there is an alarm, whether the noise is from a television in the background, whether the noises are outdoor noises (e.g., birds chirping, wind, rain, traffic horns, etc.) or inside noises, etc.

The touchpoint monitor 11 collects a variety of types of information about external viewing conditions including, but not limited to, information about noise, consumer movement, consumer device rotation and other movement, and receipt of telephone calls and messages on the consumer device. Additional information can be used to supplement the external viewing condition information to further determine the type of environment in which the consumer is consuming content. For example, global positioning system (GPS) information about the location of the consumer's device, or its movement or speed, information about the local time of day, and information about the consumer (e.g., age, gender, income, occupation, work schedule, etc.) can help identify the likely environment suggested by a particular noise (e.g., the consumer's movement during rush hour can be assumed to be riding in a car).

One aspect of the invention involves detecting how much external noise was present at the time electronic content is consumed by a consumer, for example, while the user uses a publisher's mobile device app to review an online ad from a marketing campaign. In one example, the noise is detected using a built-in microphone on the consumer's device. In one example, the system detects noise level above a predetermined threshold. Categories of types of noise (e.g., quiet, somewhat noisy, very noisy, etc.) or scales of noises (e.g., from 1-10) can be predetermined and associated with threshold values that are learned, for example via machine learning, based on analysis of which thresholds provide the most meaningful differences to the attribution process. Any appropriate existing noise analysis technique can be used including those that determine amounts or types of ambient noise rather than simply detecting loudness.

Another aspect of the invention relates to detecting that the consumer is likely walking, running, traveling in a car/bus/train/plane/etc. or otherwise moving in a particular way for an online consumer touchpoint. GPS, accelerometer, gyroscope, compass, and/or barometer technology implemented on many mobile devices provides information from which a consumer's likely movement type can be assessed. For example, the M7 chip used in iOS devices can be used to determine a consumer's likely movement type by implementing existing functions from a library such as the library of functions for detecting motion type (i.e., walking, running, or automotive) on iOS is available from GitHub, Inc. of San Francisco, Calif. (available at https://github.com/SocialObjects-Software/SOMotionDetector on May 16, 2016).

Another aspect of the invention relates to detecting a physical condition of the consumer such as, but not limited to, the consumer's heartrate, step rate, current physical activity, blood oxygen level, drowsiness, etc. The consumer's physical condition can be assessed based on information from the consumer's devices such as the consumer's camera, fitness equipment, heartrate monitor, eye sensors, weight sensors, thermometers, wearable electronics, etc.

An online consumer touchpoint can involve a length of time during which the external viewing conditions change. In one example, a consumer interacts with an online ad on a publisher's mobile app for 10 minutes. During those ten minutes, the consumer is sitting for the first five minutes and walking for the remaining five minutes. Varying conditions are addressed in different ways depending on the implementation. In one example, the dominant external viewing condition is selected as the external viewing condition for the online consumer touchpoint. If the user is walking for eight minutes and sitting for two, walking is used as the external viewing condition for the online consumer touchpoint based on it occurring for the majority of the interaction, 80% in this example. In another example, the system records both sitting and walking, the total length of the online consumer touchpoint, and the relative amounts (e.g., percentages) of the walking and sitting. In another example, the external viewing condition at a particular instance of the touchpoint is used (e.g., when the content is first received/displayed, when a particular link is selected, thirty seconds after the content is received/displayed, etc.). Generally, touchpoints and the associated user interactions are of sufficiently short duration that selecting the external viewing condition for touchpoint does not require selecting from multiple conditions. In one implementation, touchpoints are defined granularly such that online consumer touchpoints will never or rarely involve changing external viewing conditions.

Another aspect of the invention relates to detecting whether a consumer received a call during an online consumer touchpoint. In one implementation, this is achieved using proximity sensors available on the mobile phone. A proximity sensor is used to turn off the display when the user is taking a call and turn on the display when the phone is pulled away after the call. Many games automatically detect when the phone is in use or when a phone call is coming through, so that the games can pause and then resume when the call is complete. One embodiment of the invention uses a similar technique to detect the occurrences of phone call interruptions. The touchpoint monitor 11 detects the occurrence of phone calls during an online consumer touchpoint and collects relevant information about the occurrence such as the fact that the call occurred, the duration of call interruption, whether the consumer returned to content associated with the online consumer touchpoint after the call was over. In additional to phone call interruptions, other types of interruptions, such as receipt and viewing of text message and notification on mobile devices can be identified as external viewing conditions indicative of distracting environments.

Another aspect of the invention relates to, during an online consumer touchpoint, detecting whether the consumer's device is moved or rotated in ways that are likely due to a distracting environment. For example, when a consumer is in a conversation with someone and, in between consuming content of an online consumer touchpoint, he intermittently becomes immersed in conversation and turns the phone over or rests it flat on the table. People in conversations while holding mobile devices tend to move and rotate their devices in certain ways or patterns that can be identified or learned. These movements of the consumer's device are detected, for example, using the accelerometer and gyroscope sensors available in the mobile devices. iOS APIs facilitate detecting such motion events. For example, the current iOS implementations provide an CMAccelerometerData object that captures the acceleration along each of the spatial axes and an CMGyroData object captures the rate of rotation around each of the three spatial axes. This information can be used to detect during an online consumer touchpoint that acceleration is high on more than a threshold number of instances (e.g., five times), and interpret this to mean that the consumer is moving his hand a lot while consuming content of the online consumer touchpoint and thus that something such as a conversation may be distracting the consumer.

Another aspect of the invention detects the consumer's gaze during an online consumer touchpoint. In one example, a camera on a phone or other mobile device or a sensor on a wearable headset of electronic glasses detect the position and/or movements of one or both of the consumer's eyes. Particular eye focus, eye movements and/or patterns of eye behavior are identified or learned to be associated with consumers being in distracting environments. The sensor may record whether the consumer actually looked at the screen during the display of the touchpoint and if so, for how long. Similarly, movements of the consumer's head relative to the consumer's display and patterns of movement are identified or learned to be associated with consumer's being in distracting environments, e.g., looking away, viewing interruptions, etc. Whether based on eye detection, head detection, or otherwise detected, the consumer's gaze provides a useful indication of whether the consumer is in a distracting environment or whether they are even looking at the content on the screen and is thus useful to enhance the attribution of credit to online consumer touchpoints that occur while the consumer gazes in particular ways.

The purpose of collecting the external viewing condition information is generally to improve attribution of credit to online touchpoints for consumers taking desired actions. Thus, data collected regarding noise, consumer walking/running/traveling, phone movements, etc., as well as data regarding normal conditions are collected and analyzed to determine which external viewing conditions affect the key metrics of a marketing campaign that measure consumer performance of desired actions and how those external viewing conditions affect the effectiveness of certain online ads and online ad types provided as touchpoints. For example, for a display/banner ad, the server 2 identifies that the click through rate is 5% when the consumer is stationary but just 2% when the consumer is walking. Whether the consumer is walking or not matters in a meaningful way. The effectiveness of a banner ad is 60% less when the consumer views it while walking. In another example, the server 2 determines that the view through rate of a video ad (e.g., the percentage viewed before consumer skips the remainder) is 25% when a consumer is in calm surroundings but is 50% when the consumer is in noisy surroundings.

Using the external viewing condition data collected, the server 2 determines how key metrics of the campaign consumption are being affected by the external viewing conditions. In one embodiment of the invention, the effects are determined through a machine learning technique that takes into account statistical data received over time for multiple consumers. The server through machine learning or otherwise determines the effectiveness of particular online ads or online ad types in particular external viewing conditions and the types of environments (e.g., calm, distracting, etc.) created by those external viewing conditions. The collected data about touchpoints used to facilitate such determinations, in one example, includes information identifying an online ad, an online ad type, the external viewing conditions during consumption, and/or other relevant information about the touchpoint which are used via the machine learning or other technique to determine which external viewing conditions are important in evaluating effectiveness and attribution. It may also take into account combinations of external viewing conditions, such as high brightness and motion, indicating the consumer is likely walking outside in the sunlight. Especially when used in conjunction with machine learning algorithms, it is not necessary to identify the actual state of the consumer, such as walking, or noise above a certain level. The algorithm may simply consider the combinations of measured values and determine weights for particular combinations, without identifying what a particular combination means. Small changes in one measured value may have little to no effect on the weights, while a small change of a different value may have a large effect. The machine learning algorithm may determine that a particular measured value, such as noise, is only relevant when certain other values, such as motion and light, are above or below certain thresholds.

The attributor 13 of server 2 attributes credit to touchpoints in a way that accounts for significant external viewing condition data. In one example, the attributor 13 determines that there were four touch points (T1, T2, T3 and T4) with the corresponding attribution as (25%, 35%, 30% and 10%) using an attribution algorithm. However, the attributor 13 also identifies that touch point 3 (a banner ad) was consumed while the consumer was walking and therefore, its actual attribution should be 30*(⅖)=12% and the remaining 18% from its attribution should be proportionally attributed to T1, T2 and T3, giving a revised attribution (rounded to the nearest percentages of 31%, 44%, 12%, 13%). In this example, the attributor 13 recognizes that the attribution for one of the touchpoints should be less because the consumer was walking and adjusted an already determined attribution accordingly. In another example, the attributor 13 instead uses the external viewing condition effectiveness data in creating the initial attribution.

In one embodiment of the invention, an environment is characterized by one or more external viewing conditions. For example, a "driving to work" environment can be characterized based on detecting the user device moving at a rate characteristic of vehicle speeds and the time of day. The environment information is then used to create and/or adjust an attribution.

In another embodiment of the invention, the effectiveness of online consumer touchpoints is further tailored based on audience segment to provide an attribution that is both tailored to external viewing conditions and to audience segment. Thus, a consumer in one segment having an online consumer interaction is treated differently than a consumer in another segment having the same online consumer interaction. As a specific example, for a consumer in the "under age 18" segment, the attribution of the consumer's online interaction with a banner ad while walking will be greater than for the same online consumer interaction for a consumer in the "over age 18" segment.

The server 18, in one embodiment, is further configured with consumer privacy protection features. In one example, the server maintains consumer profiles that specify consumer privacy settings for each consumer. Each consumer, in this example, has an option to opt in or out of sharing external viewing condition data and/or from online consumer touchpoints accessing microphones, cameras, motions sensors, and/or other sensors and related information on the consumer's electronic devices. In another example, consumer privacy is protected by only collecting aggregate data from multiple consumer devices such that individual consumers remain anonymous. Such data can be configured to intentionally exclude any consumer identifying information such as personal identifiers and the like.

Generally, collecting external viewing condition information provides numerous advantages. Collecting such information facilitates an effectiveness determination and attributions that take into account the external viewing conditions/environments that consumers were in when they were consuming online consumer touchpoint content. The additional information enhances existing attribution techniques and facilities new attribution techniques that provide more accurate attributions of credit for consumer conversions and other desired consumer actions. The external viewing condition information is also available to be used for other marketing purposes. In one example, external viewing condition information is used to determined that one or more consumers frequently interact with online ads when they are walking on a treadmill. This information is then used to segment the consumer audience and to target those consumers in the "walking while watching" segment.

Figure 5:
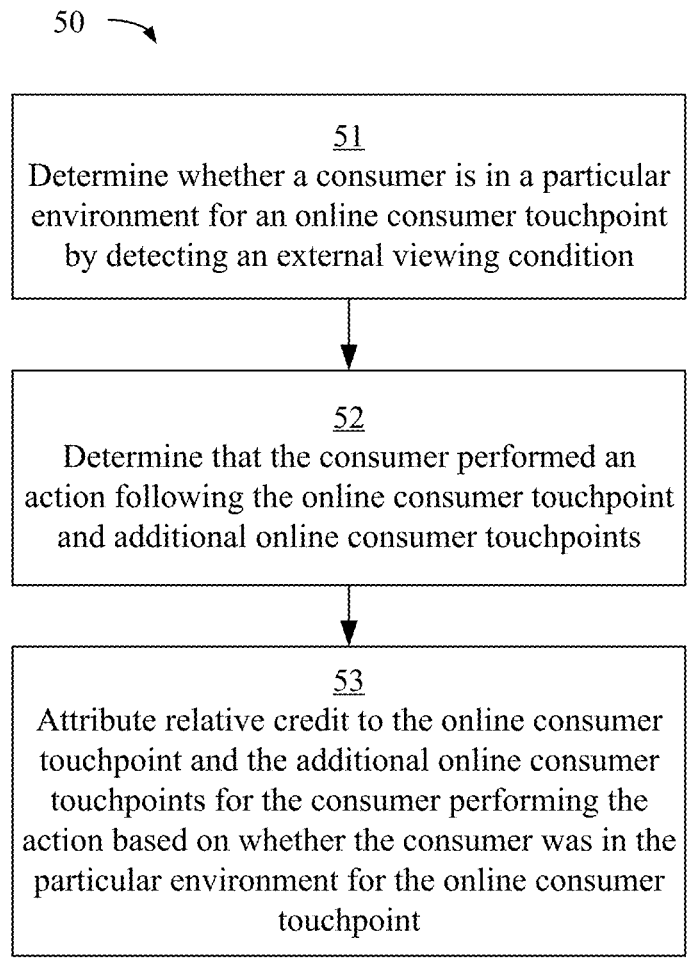
FIG. 5 is a flow chart illustrating an exemplary method for attributing credit to online consumer touchpoints for a consumer performing an action.

FIG. 5 is a flow chart illustrating an exemplary method for attributing credit to online consumer touchpoints for a consumer performing an action Exemplary method 50 is performed by one or more processors of one or more computing devices such as server 2 of FIG. 1.

The method 50 involves determining whether a consumer is in a particular environment for an online consumer touchpoint by detecting an external viewing condition, as shown in block 51. Detecting the external viewing condition can involve detecting one or more conditions during an online consumer touchpoint. In one example, detecting the external viewing condition involves detecting that the consumer is stationary, walking, or running for the online consumer touchpoint based on detecting movement of a device being used by the consumer for the online consumer touchpoint. In another example, detecting the external viewing condition involves detecting that the consumer is in a moving vehicle for the online consumer touchpoint based on detecting movement of a device being used by the consumer for the online consumer touchpoint. In another example, detecting the external viewing condition involves detecting noise using a microphone of a device being used by the consumer for the online consumer touchpoint. In another example, detecting the external viewing condition involves detecting a telephone call received on a device being used by the consumer for the online consumer touchpoint. In yet another example, detecting the external viewing condition involves detecting rotation or movement of a device being used by the consumer for the online consumer touchpoint. In yet another example, detecting the external viewing condition involves detecting a physiological condition of the consumer for the online consumer touchpoint based on a body sensor on a device being used by the consumer.

Determining whether a consumer is in a particular environment can simply involve determining that a particular external condition is present for example. Detecting a level of ambient noise above a certain threshold can be used to determine that there was a distracting environment. Another implementation may determine the scale of the distraction relative to amount of ambient noise, rather than using an absolute threshold. In other instances, determining whether a consumer is in a particular environment uses information about multiple aspects of the online consumer touchpoint including, but not limited to, information about multiple external viewing conditions and other types of information. In one example determining whether a consumer is in the particular environment for the online consumer touchpoint is based on detecting a time of day during the online consumer touchpoint, detecting a global positioning system (GPS) location of the consumer during the online consumer touchpoint, detecting a duration of the online consumer touchpoint, and/or detecting whether headphones are being used by the consumer during the online consumer touchpoint. Ambient noise may be less important if the consumer is wearing headphones.

The method 50 further involves determining that the consumer performed an action following the online consumer touchpoint and additional online consumer touchpoints, as shown in block 52. For example, a server 2 tracks whether the consumer makes an online or in store purchase following a series of tracked online consumer touchpoints. The purchase or other conversion is then associated with the online consumer touchpoints that led up to and thus contributed to the consumer's decision to complete the purchase. In the example of FIG. 5, the online consumer touchpoints that involves the external viewing condition and additional online consumer touchpoints. In determining the proper weights for various environmental conditions, a machine learning algorithm may also consider consumers who viewed ads under various conditions or combinations of conditions and then did not convert, indicating that these conditions might not be conducive to effective ad consumption.

The method 50 further involves attributing relative credit to the online consumer touchpoint and the additional online consumer touchpoints for the consumer performing the action based on whether the consumer was in the particular environment for the online consumer touchpoint, as shown in block 53. Attributing the relative credit, in one example, involves determining an effectiveness of the online consumer touchpoint in the particular environment and attributing the relative credit based on the effectiveness of the online consumer touchpoint in the particular environment. Attributing the relative credit can involve adjusting an existing attribution or creating a new attribution using an attribution algorithm.

Online ads are distributed to consumers based on the attributing of method 50. As examples, based on the attributing, online ads are distributed via a website, an ad-supported mobile game app, an ad-supported mobile media app, a retailer app, a social media app or website, and/or keyword search-based advertising.

Exemplary Computing Environment

Figure 6:
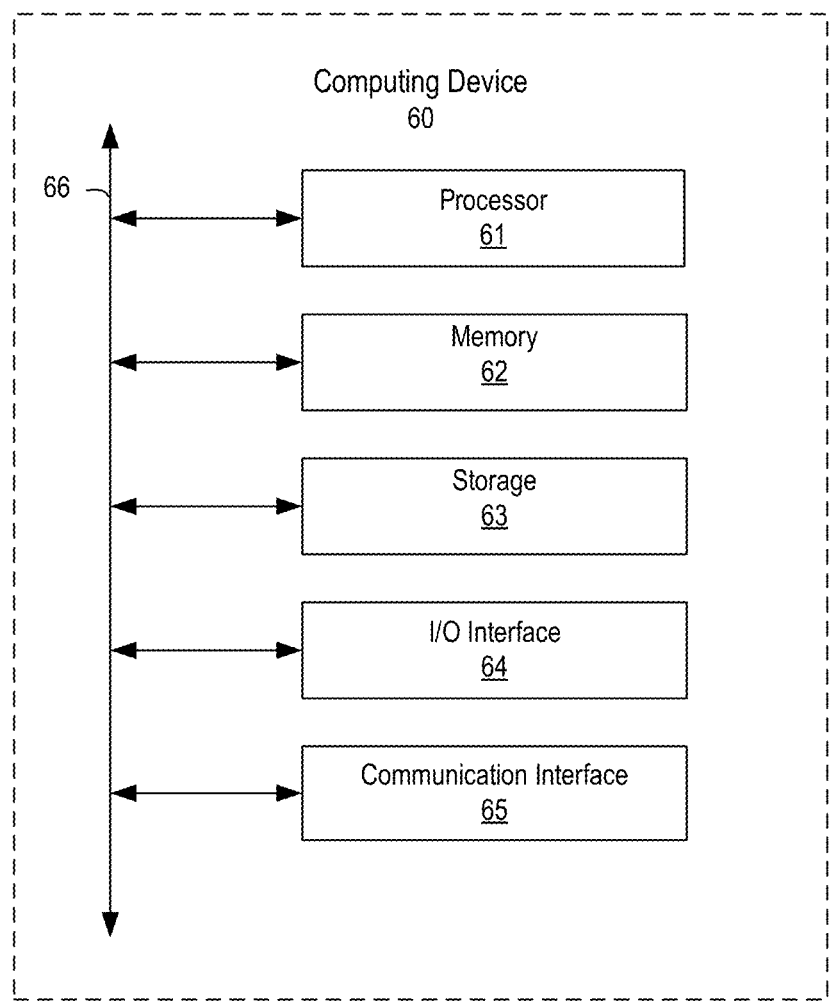
FIG. 6 is a block diagram depicting an example hardware implementation.

Any suitable computing system or group of computing systems can be used to implement the techniques and methods disclosed herein. For example, FIG. 6 is a block diagram depicting examples of implementations of such components. The computing device 60 can include a processor 61 that is communicatively coupled to a memory 62 and that executes computer-executable program code and/or accesses information stored in memory 62 or storage 63. The processor 61 may comprise a microprocessor, an application-specific integrated circuit ("ASIC"), a state machine, or other processing device. The processor 61 can include one processing device or more than one processing device. Such a processor can include or may be in communication with a computer-readable medium storing instructions that, when executed by the processor 61, cause the processor to perform the operations described herein.

The memory 62 and storage 63 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 60 may also comprise a number of external or internal devices such as input or output devices. For example, the computing device is shown with an input/output ("I/O") interface 64 that can receive input from input devices or provide output to output devices. A communication interface 65 may also be included in the computing device 60 and can include any device or group of devices suitable for establishing a wired or wireless data connection to one or more data networks. Non-limiting examples of the communication interface 65 include an Ethernet network adapter, a modem, and/or the like. The computing device 60 can transmit messages as electronic or optical signals via the communication interface 65. A bus 66 can also be included to communicatively couple one or more components of the computing device 60.

The computing device 60 can execute program code that configures the processor 61 to perform one or more of the operations described above. The program code can include one or more modules. The program code may be resident in the memory 62, storage 63, or any suitable computer-readable medium and may be executed by the processor 61 or any other suitable processor. In some embodiments, modules can be resident in the memory 62. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for attributing credit to one or more online consumer touchpoints for a consumer performing an action, the method comprising:

detecting an external viewing condition for the one or more online consumer touchpoints, wherein the one or more online consumer touchpoints include an advertisement received through an electronic network and wherein the external viewing condition indicates whether the consumer is in a distracting environment during the one or more online consumer touchpoints;

determining that the consumer performed the action following the one or more online consumer touchpoints;

determining an effectiveness of the one or more online consumer touchpoints by applying a machine learning technique to the external viewing condition and touchpoint data associated with the one or more online consumer touchpoints, wherein the machine learning technique accounts for the effectiveness of particular consumer touchpoints in particular external viewing conditions and types of environments created by the particular external viewing conditions, and wherein the machine learning technique accounts for combinations of external viewing conditions and types of environments under which consumers interacted with a product without converting the interaction into a purchase; and attributing relative credit to the one or more online consumer touchpoints for the consumer performing the action based on the effectiveness of the one or more online consumer touchpoints.

2. The method of claim 1, wherein attributing relative credit comprises adjusting an existing attribution based on whether the consumer was in the distracting environment for the one or more online consumer touchpoints.

3. The method of claim 1, wherein attributing relative credit comprises creating a new attribution based on whether the consumer was in the distracting environment for the one or more online consumer touchpoints.

4. The method of claim 1, wherein attributing relative credit comprises creating a new attribution based on a degree to which the consumer was in the distracting environment for the one or more online consumer touchpoints.

5. The method of claim 1, wherein detecting the external viewing condition comprises detecting that the consumer is in a moving vehicle for the one or more online consumer touchpoints based on detecting movement of a device being used by the consumer for the one or more online consumer touchpoints.

6. The method of claim 1, wherein detecting the external viewing condition comprises detecting sound patterns or sound levels using a microphone of a device being used by the consumer for the one or more online consumer touchpoints.

7. The method of claim 1, wherein detecting the external viewing condition comprises detecting a telephone call received on a device being used by the consumer for the one or more online consumer touchpoints.

8. The method of claim 1, wherein detecting the external viewing condition comprises detecting rotation or movement of a device being used by the consumer for the one or more online consumer touchpoints.

9. The method of claim 1, wherein detecting the external viewing condition comprises detecting a physiological condition of the consumer for the one or more online consumer touchpoints based on a body sensor on a device being used by the consumer.

10. The method of claim 1, wherein determining whether a consumer is in the distracting environment for the one or more online consumer touchpoints is based on detecting time of day.

11. The method of claim 1, wherein determining whether a consumer is in the distracting environment for the one or more online consumer touchpoints is based on detecting global positioning system (GPS) location.

12. The method of claim 1, wherein determining whether a consumer is in the distracting environment for the one or more online consumer touchpoints is based on detecting a duration of the online consumer touchpoint.

13. The method of claim 1, wherein determining whether a consumer is in the distracting environment for the one or more online consumer touchpoints comprises detecting whether headphones are being used by the consumer during the one or more online consumer touchpoints.

14. The method of claim 1, wherein the distracting environment for the one or more online consumer touchpoints is only defined based on a value from a sensor without determining a human activity corresponding to a precise state of the consumer.

15. The method of claim 1, wherein the distracting environment for the one or more online consumer touchpoints is defined based on values from multiple sensors.

16. The method of claim 1, further comprising, based on the attributing, distributing online ads to consumers via an ad-supported mobile game app, an ad-supported mobile media app, a retailer app displaying online ads for products available from the retailer, social media online advertising, or search keyword advertising.

17. A computer program product for attributing credit to online consumer touchpoints for a consumer performing an action, the computer program product being tangibly embodied on a non-transitory computer-readable storage medium and comprising instructions that, when executed by at least one computing device, are configured to cause the at least one computing device to perform the steps of:
detecting an external viewing condition for an online consumer touchpoint based on receiving information from a sensor on a device used by the consumer during the online consumer touchpoint, wherein the online consumer touchpoint comprises an advertisement received through an electronic network and wherein the external viewing condition indicates whether the consumer is in a distracting environment during the online consumer touchpoint;
determining that the consumer performed the action following the online consumer touchpoint and additional online consumer touchpoints;
determining an effectiveness of the online consumer touchpoint by applying a machine learning technique to the external viewing condition and touchpoint data associated with the one or more online consumer touchpoints, wherein the machine learning technique accounts for the effectiveness of particular consumer touchpoints in particular external viewing conditions and types of environments created by the particular external viewing conditions, and wherein the machine learning technique accounts for combinations of external viewing conditions and types of environments under which consumers interacted with a product without converting the interaction into a purchase; and
attributing relative credit to the online consumer touchpoint and the additional online consumer touchpoints for the consumer performing the action based on the effectiveness of the online consumer touchpoint.

18. A system comprising:
a processor; and a non-transitory computer-readable medium comprising instructions, wherein when executed by the processor, the instructions perform steps comprising:
detecting an external viewing condition for an online consumer touchpoint, wherein the online consumer touchpoint comprises an advertisement received through an electronic network and wherein the external viewing condition indicates whether a consumer is in a distracting environment during the online consumer touchpoint;
determining that the consumer performed an action following the online consumer touchpoint and additional online consumer touchpoints;
determining an effectiveness of the online consumer touchpoint by applying a machine learning technique to the external viewing condition and touchpoint data associated with the one or more online consumer touchpoints, wherein the machine learning technique accounts for the effectiveness of particular consumer touchpoints in particular external viewing conditions and types of environments created by the particular external viewing conditions, and wherein the machine learning technique accounts for combinations of external viewing conditions and types of environments under which consumers interacted with a product without converting the interaction into a purchase; and attributing relative credit to the online consumer touchpoint and the additional online consumer touchpoints for the consumer performing the action based on the effectiveness of the online consumer touchpoint.

19. The computer program product of claim 17, wherein the instructions that cause the at least one computing device to perform the step of attributing relative credit comprise instructions that, when executed, cause the at least one computing device to perform the step of adjusting an existing attribution based on whether the consumer was in the distracting environment for the online consumer touchpoint.

20. The system of claim 18, wherein the instructions that perform the step of attributing relative credit comprise instructions that perform the step of adjusting an existing attribution based on whether the consumer was in the distracting environment for the online consumer touchpoint.

* * * * *